UNITED STATES PATENT OFFICE.

WOLDEMAR ELLRAM, OF SIMFEROPOL, RUSSIA.

PRODUCTION OF SEALING AND BOTTLE-CLOSING WAX.

SPECIFICATION forming part of Letters Patent No. 666,046, dated January 15, 1901.

Application filed July 10, 1899. Serial No. 723,393. (No specimens.)

*To all whom it may concern:*

Be it known that I, WOLDEMAR ELLRAM, a subject of the Emperor of Russia, and a resident of Simferopol, Russia, have invented certain new and useful Improvements in the Production of Sealing and Bottle-Closing Wax; and I do hereby declare the following to be a full, clear, and exact description of the invention, such as will enable others skilled in the art to which it appertains to make and use the same.

This invention has relation to the manufacture of sealing-wax for general purposes for which such has heretofore been used.

The sealing-wax hitherto manufactured, although practically waterproof, is not proof against the action of alcohols and alcoholic liquids. It is more or less readily dissolved thereby, becomes soft and drops off, while the contents of the vessel sealed are often contaminated by the dissolved sealing-wax. On the other hand, sealing-wax as hitherto manufactured is too sensitive to climatic influences and temperature variations. At low temperatures it becomes brittle and is liable to crack and peel off, and at higher temperatures it softens very materially.

This invention has for its object the manufacture of a sealing-wax free from the disadvantages referred to—namely, a sealing-wax insoluble in alcohols generally, (ethyl and methyl), absolutely waterproof, and indifferent to the most varied climatic temperature variations. This I attain by substituting for the resins hitherto employed, and which are soluble in alcohol, their salts of the alkaline earths or earths and heavy metals which are insoluble in water, alcohol, or alcoholic liquids, as the resinates of calcium, magnesium, aluminium, iron, zinc, lead, and manganese. Experiments have shown that the resinic acids, especially abietic acid, which are insoluble in alcohol, are not only non-hygroscopic and have a comparatively high melting-point, but are particularly well adapted as substitutes for the resins hitherto used in the manufacture of sealing-wax, in that, irrespective of their indifference to the action of alcohols, they are also indifferent to moisture and all climatic temperature variations. On the other hand, sealing-wax made of these resinates has the further advantage over the sealing-wax now in use in that it requires a much higher temperature to melt it and does not therefore melt and drop off the stick when barely ignited or even before being ignited, as is the case with the sealing-wax now in use.

In carrying out my invention I preferably use what is known as "American" or "French" resin or colophony, a transparent product free from water, the residue of the distillation of turpentine obtained from the pinus, abies, or larix, because it is an almost pure abietic acid. If, for instance, pulverized hydrate of lime (or calcium oxid) is added to melted colophony, foaming and evaporation of water in the form of steam ensues under formation of the desired product—namely, calcium abietinate, which is insoluble in all alcohols generally. If oleic acid is added to the aforesaid mixture, a reaction will take place in accordance with the following equation:

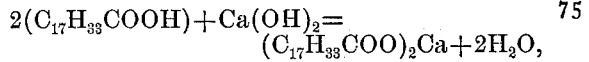

$$2(C_{17}H_{33}COOH) + Ca(OH)_2 = (C_{17}H_{33}COO)_2Ca + 2H_2O,$$

whereby a mixture of calcium oleate and calcium abietinate is obtained, which will result in a sealing-wax of somewhat-reduced melting-point suitable for colder climates, and to this mixture may be added substances such as will give it body and modify its consistency. Bottle-sealing wax, such as referred to, may therefore be of the following composition: colophony, one hundred parts by weight; oleic acid, one hundred parts by weight; calcium hydrate, seven parts by weight; solar oil, fourteen parts by weight; barium sulfate, one hundred parts, by weight.

Under the term "solar oil" I mean a hydrocarbon oil of a specific gravity of from 0.80 to 0.83 and a boiling-point of from 245° to 310° centigrade.

The compounding is or may be effected as follows: The colophony or kindred resin is melted, preferably in a steam-jacketed vessel, and when so melted the pulverized calcium hydrate and oleic acid are added. The heating at a temperature of about 150° centigrade is continued until the water separated has all been vaporized, when the reactions will have taken place, after which the solar oil and the finely-pulverized barium sulfate are added, and finally any suitable dyestuff or coloring-matter, these additions being of course effected under constant stirring of the substances, either by hand or mechanically, so as to obtain an intimate admixture. In this compound the abietic acid and the oleic acid are not completely or fully combined with the base—*i. e.*, the calcium in this case—the sealing-wax being intended, for instance, for the sealing of bottles containing liquids holding only about ninety per cent. of ethyl alcohol in solution. If, on the other hand, the sealing-wax is to be used for sealing bottles holding pure ethyl or methyl alcohols, I add 14.4 parts, by weight, more of calcium hydrate—*i. e.*, 21.4 parts instead of seven parts—the resulting sealing-wax also having a higher melting-point. The sealing-wax composed as described in the first example has a melting-point of about 115° centigrade; but by dispensing with the oleic acid the melting-point will be raised to about 140° centigrade. Of course the added constituents, as the barium sulfate and the solar oil, the former as a filler, while the latter renders the sealing-wax more ductile, are both insoluble in alcohols and indifferent to climatic temperature variations.

Instead of barium sulfate chalk, magnesite, zinc-white, infusorial earth, ocher, and the like may be used, and instead of oleic acid certain oleates may be used which are likewise insoluble in alcohols—as, for instance, the palmitates and stearates—although less desirable on account of their high melting-point, so that by a proper choice and proportion of such substances the melting-point of the final product can be varied from about 112° centigrade, or even lower, to about 160° centigrade. I have found also that a slight excess of free abietic acid renders the sealing-wax slightly soluble in alcohols; but this is of no importance in a general sense in view of the fact that the alcoholic liquids generally stored in sealed vessels do not contain sufficient alcohol to attack the sealing-wax, while this solubility can be readily avoided by binding all of the free abietic acid in the manufacture of sealing-wax for sealing bottles containing pure alcohols. This invention therefore lies, first, in the use of resinates, either wholly insoluble in alcohols or difficult of solution therein, preferably abietinates of the alkaline-earth metals or of the earths and heavy metals, in lieu of the rosins and similar substances heretofore used and soluble in alcohols; secondly, in the use of a hydrocarbon, as solar oil, insoluble in or difficult of solution in alcohols, together, if desired, with oleates, palmitates, and stearates insoluble in or difficult of solution in alcohol, a filling material, and a coloring matter or matters likewise insoluble in alcohols. In other words, all of the constituents employed in the manufacture of sealing-wax in accordance with my invention should be practically indifferent to the action of alcohols, while by a proper compounding in suitable proportions the melting-point of the final product can be varied within comparatively wide limits.

I have hereinbefore stated that the resinates of the metals of the alkaline earths, the earths, and heavy metals can be used, the reactions taking place in accordance with the following equations, from which the proportions are deducible, the reaction in the case of calcium hydrate having been given hereinbefore:

$$2(C_{18}H_{27}COOH) + Zn(OH)_2 = Zn(C_{18}H_{27}COO)_2 + 2H_2O.$$

$$2(C_{18}H_{27}COOH) + ZnO = Zn(C_{18}H_{27}COO)_2 + H_2O.$$

$$2(C_{18}H_{27}COOH) + PbO = Pb(C_{18}H_{27}COO)_2 + H_2O.$$

$$6(C_{17}H_{33}COOH) + Al_2(OH)_6 = Al_2(C_{17}H_{33}COO)_6 + 6H_2O.$$

Having thus described my invention, what I claim as new therein, and desire to secure by Letters Patent, is—

1. The process, which consists in reacting upon a substance rich in abietic acid, as colophony and kindred resins, with an oxid or hydroxid of a metal of the alkaline earths or heavy metals to form an abietinate insoluble or difficult of solution in alcohols, and mixing therewith a suitable filler and, if desired, coloring-matter, both insoluble in alcohols, for the purpose set forth.

2. The process, which consists in reacting upon a substance rich in abietic acid, as colophony and kindred resins, with an oxid or hydroxid of the metals of the alkaline earths, or heavy metals, in the presence of oleic acid, mixing therewith a suitable filler, and if desired, coloring-matter, both insoluble in alcohols, for the purpose set forth.

3. The process, which consists in reacting upon melted colophony or kindred resins with an oxid or hydroxid of a metal of the alkaline earths, or heavy metals insoluble in alcohols, in the presence of oleic acid, mixing therewith a hydrocarbon insoluble in alcohols, a filler, and, if desired, coloring-matter, likewise insoluble in alcohols, for the purposes set forth.

4. The process, which consists in reacting upon melted colophony or kindred resins with calcium hydrate in the presence of oleic acid, mixing therewith solar oil or a kindred hydrocarbon insoluble in alcohol, barium sulfate or a kindred filler, and, if desired, coloring-matter insoluble in alcohols, substantially as set forth.

5. The herein-described sealing-wax, consisting essentially of an abietinate of a metal of the alkaline earths, or heavy metals, insoluble in alcohols, a suitable filler and, if desired, a coloring-matter, substantially as set forth.

6. The herein-described sealing-wax, consisting essentially of an abietinate and an oleate of a metal of the alkaline earths, or heavy metals insoluble in alcohols, a hydrocarbon insoluble in alcohols, barium sulfate, or a kindred filler insoluble in alcohols, and, if desired, a coloring-matter insoluble in alcohols, substantially as and in about the proportions set forth.

In testimony that I claim the foregoing as my invention I have signed my name in presence of two subscribing witnesses.

WOLDEMAR ELLRAM.

Witnesses:
BOLESDANE HARODZIN,
JULIUS S. KERUGEB.